(12) United States Patent
Benthien et al.

(10) Patent No.: US 12,234,856 B2
(45) Date of Patent: Feb. 25, 2025

(54) FASTENING SYSTEM

(71) Applicant: Airbus Operations GmbH, Hamburg (DE)

(72) Inventors: Hermann Benthien, Sottrum (DE); Andreas Poppe, Reeßum (DE)

(73) Assignee: Airbus Operations GmbH, Hamburg (DE)

( * ) Notice: Subject to any disclaimer, the term of this patent is extended or adjusted under 35 U.S.C. 154(b) by 560 days.

(21) Appl. No.: 17/535,856

(22) Filed: Nov. 26, 2021

(65) Prior Publication Data
US 2022/0170492 A1 Jun. 2, 2022

(30) Foreign Application Priority Data

Nov. 30, 2020 (DE) .................. 10 2020 131 656.9

(51) Int. Cl.
*F16B 31/00* (2006.01)
*B64C 7/00* (2006.01)
*F16B 5/02* (2006.01)

(52) U.S. Cl.
CPC .............. *F16B 5/0258* (2013.01); *B64C 7/00* (2013.01)

(58) Field of Classification Search
CPC .................................................... F16B 5/0258
USPC ..................................... 411/1, 3, 9, 10, 544
See application file for complete search history.

(56) References Cited

U.S. PATENT DOCUMENTS

| | | | | | |
|---|---|---|---|---|---|
| 1,460,749 | A | * | 7/1923 | Dull | B21L 9/00 29/520 |
| 2,058,452 | A | * | 10/1936 | Hoffman | F16B 43/00 411/929 |
| 3,948,141 | A | * | 4/1976 | Shinjo | F16B 31/028 73/761 |
| 3,992,974 | A | * | 11/1976 | Miki | F16B 43/00 29/445 |
| 4,020,734 | A | * | 5/1977 | Bell | F16B 31/028 411/10 |
| 4,889,457 | A | * | 12/1989 | Hageman | F16B 31/028 411/10 |

(Continued)

FOREIGN PATENT DOCUMENTS

DE       69212064 T2    3/1997
DE   102018112783 A1   12/2019

OTHER PUBLICATIONS

German Search Report for Application No. 102020131656 dated Jul. 7, 2021.

*Primary Examiner* — Gary W Estremsky
(74) *Attorney, Agent, or Firm* — KDW Firm PLLC

(57) ABSTRACT

A fastening system includes a first fastening element attachable to a structure and which has a base portion for plugging through a structural opening, a second fastening element, and a plastically deformable funnel element. The funnel element has a funnel-like basic shape with a funnel opening. The second fastening element can be introduced through the funnel opening into a receiving opening of the base portion and fastened therein and has a collar which faces away from the receiving opening and which is larger than the funnel opening. The funnel element is designed to be deformed from the funnel-like basic shape into a flat, disk-like final shape by the collar of the second fastening element during the fastening of the second fastening element.

13 Claims, 5 Drawing Sheets

(56) References Cited

U.S. PATENT DOCUMENTS

| | | | | |
|---|---|---|---|---|
| 5,556,234 A | * | 9/1996 | Oldsen | E21D 21/0086 405/259.1 |
| 7,198,445 B2 | * | 4/2007 | Kramer | F16B 39/24 411/161 |
| 10,408,250 B2 | * | 9/2019 | Webb | F16B 31/02 |
| 2015/0219140 A1 | * | 8/2015 | Jenning | F16B 33/008 29/458 |
| 2019/0338794 A1 | * | 11/2019 | Struhl | F16B 19/02 |
| 2020/0149568 A1 | * | 5/2020 | Prevost | F16B 5/10 |

\* cited by examiner

FASTENING SYSTEM

CROSS-REFERENCE TO RELATED APPLICATION

This application claims priority to German Patent Application No. DE 10 2020 131656.9 filed Nov. 30, 2020, the entire disclosure of which is incorporated by reference herein.

TECHNICAL FIELD

The disclosure herein relates to a fastening system for the blind fastening of articles and also to a vehicle comprising a structure and at least one such fastening system.

BACKGROUND

Various fastening apparatuses and systems are known for fastening articles to a structure for example of a vehicle. The fastening is usually effected by attaching a fastening element to the structure in question and a fastening element which corresponds thereto to the component in question. Both are positioned relative to one another and then connected together. The first fastening elements and the second fastening elements can be embodied in many different ways. In addition to through-openings, which are used for the purpose of plugging through bolts, sleeves, screws, hooks and the like, more complex systems with structure-mounted rails are also known. The fastening of relatively large articles requires a certain level of skill during the positioning and the attachment of the fastening elements, since the fastening elements have to be aligned with one another. Complete blind installation of components from one side is currently not possible in the case of relatively large vehicles since at least thermal decoupling and electrical coupling of components is required.

SUMMARY

It is the object of the disclosure herein to disclose a fastening apparatus or a fastening system which also permits the blind installation of relatively large fixtures in a vehicle or other structures in a very convenient manner, the intention being for the attachment and fastening of fastening elements to be as straightforward as possible, and it still being possible for thermal decoupling and electrical coupling to be carried out.

The object is achieved by a fastening system having features disclosed herein. Advantageous embodiments and refinements are disclosed herein.

A fastening system is disclosed, comprising a first fastening element which can be attached to a structure and which has a base portion for plugging through a structural opening, a second fastening element, and a plastically deformable funnel element, the funnel element having a funnel-like basic shape with a funnel opening, the second fastening element being able to be introduced through the funnel opening into a receiving opening of the base portion and being able to be fastened therein and having a collar which faces away from the receiving opening and which is larger than the funnel opening, and the funnel element being designed to be deformed from the funnel-like basic shape into a flat, disk-like final shape by the collar of the second fastening element during the fastening of the second fastening element.

The fastening system according to the disclosure herein is a particularly convenient, flexibly adaptable blind fastening system which allows fastening to be performed from one side after the vehicle structure has been correspondingly prepared. The components usable for this purpose can be inexpensively produced and can be adapted to different application purposes by selection of the dimensions. The fastening system also permits continuous electrical contact if the individual components are produced from a metallic or conductive material.

The first fastening element forms a base for the entire fastening arrangement. The structure has to be provided with a through-opening into which the base portion of the first fastening element can be plugged. The base portion could for instance be in the form of a sleeve or bushing and is designed to be complementary to the through-opening. The base portion does not necessarily have to extend through the entire through-opening, but could also end in the through-opening.

For the function as a base, it is expedient for the first fastening element to be fastened to the structure. This may be achieved by various measures depending on the embodiment of the structure. The through-opening could have an internal thread, while the first fastening element has an external thread. It can then be screwed into the through-opening. It would then also be expedient for the first fastening element to have a collar or the like as a mechanical stop, such that the screwing-in operation serves primarily for fixing and not for absorbing all the loads.

However, the base portion could also extend through the entire through-opening and be secured on the other side by a nut or another screw element. Here, too, it is expedient for the first fastening element to have arranged on it a collar which prevents the fastening element from slipping through and permits a reliable introduction of force into the structure.

Many other variants are also conceivable in which the base portion is adhesively bonded or retained in some other way in the opening so as to be fixed at a specific location until the actual assembly operation. The aforementioned collar, which establishes electrical contact with the structure, will then lend itself. It should be noted at this point that, in order to improve the electrical contact, the surface of the collar facing the structure may be roughened and, as a result, establishes particularly good electrical contact when the first fastening element is axially braced. All of the fastening variants conventional in the art for attaching the first fastening element can be considered here and are not intended to limit the subject matter of the disclosure herein in its general form.

The second fastening element is designed to be connected to the first fastening element. It is preferably designed at least in certain regions as an elongate element which can be introduced from a side of the structure into the first fastening element so as to be connected there to the latter. In a simple case, this may be achieved by a screw connection. However, other variants, such as for example ball lock pins or similar, are also possible.

The plastically deformable funnel element has a basic shape which corresponds to a funnel. This means that there is a funnel opening surrounded by a conically tapering collar which forms the funnel shape. The special feature of the funnel element lies in the plastic deformability, which is utilized to produce a disk-like final shape from the funnel-like basic shape. For this reason, the lateral surface of the funnel element should be provided so as to carry out a slight, radial extension of the funnel element under the action of the force of the collar of the second fastening element when it is being pushed on, while the conically tapering lateral surface gradually approaches a flat, disk-like shape. The collar of the second fastening element consequently rests tightly on the funnel element. This can lead to improved electrical contact. In addition, the funnel element makes it possible to achieve a form-fitting connection of an insulating material located beneath it, which leads to thermal decoupling.

The advantage of the funnel element lies in the funnel shape, which makes the introduction of the second fastening element much easier for a user. When the article to be fastened is merely roughly positioned and/or the second fastening element is only roughly aligned, it is necessary merely for an opening of the funnel element to be reached such that the funnel element guides the second fastening element to the funnel opening. The funnel opening can be aligned with the first fastening element. During bracing of the connection, the funnel shape widens, as explained above, and forms a disk which performs a holding function. As explained further below, this could be effected at a distance from the first fastening element, such that it is for example possible for one or more insulation packs or other elements to be held between the funnel element and the structure.

Overall, the fastening system according to the disclosure herein is consequently a very flexible blind fastening system which is easy to handle and which allows a user to establish a connection to a structure from one side, without it being necessary to carry out complex positioning and orientation. Electrical coupling can be readily produced in a reliable manner and thermal decoupling is possible. The fastening system according to the disclosure herein is moreover suitable for carrying out an automated fastening operation.

In an advantageous embodiment, the fastening system may also comprise a spacer with a through-bore, the spacer being able to be positioned between the first fastening element and the funnel element and having a support surface for supporting the funnel element. The spacer is accordingly provided to produce a distance between the first fastening element and the funnel element. During the deformation of the funnel element, the latter comes to rest on a support surface of the spacer and in this case forms the disk-like shape at the distance predefined by the spacer. The spacer could be adapted to the individual application purpose in order to, for example, fix an insulating pack or another body of at least partially sheetlike form.

The spacer could be a sleeve. In the simple case, the sleeve could be of hollow-cylindrical embodiment, such that an end surface facing away from the first fastening element forms the support surface. However, it might also be expedient to provide a separate collar which functions as a support surface.

In an advantageous embodiment, the spacer could have a circumferential, radial protrusion for holding a body between the protrusion and the structure. The holding function may accordingly be implemented directly by the spacer, it being possible for a further, sheetlike element to be positioned between the circumferential, radial protrusion and the disk-like funnel element or between the circumferential, radial protrusion and the structure.

The support surface could be ring-shaped and surround the through-bore at an end facing the funnel element. The ring-shaped support surface is preferably adapted to the expected compressive force to be exerted on the funnel element during deformation thereof.

It is advantageous for the spacer and the funnel element to be embodied as a one-piece element. The one-piece body may therefore be placed onto the first fastening element in a simple manner. Positioning of the spacer and of the funnel element relative to one another is always ensured.

The first fastening element preferably has a threaded bushing and a nut for fastening the threaded bushing. The embodiment is particularly simple and inexpensive, and additionally the threaded bushing is firmly fixed to the structure and the electrical contact is reliably established.

The funnel element could also have a plurality of segments which are distributed in a circumferential direction and which each have a radially external free end and a radially internal fixed end. The funnel element may consequently be designed in the form of a flower, and the individual segments are individually pushed from an oblique position into an exclusively radial position by the second fastening element. The segments may be embodied substantially in the form of circle segments.

In an advantageous embodiment, the first fastening element has at least one circumferential groove in the receiving opening, the second fastening element being a ball lock pin with radially movable locking balls which project into the at least one groove when the second fastening element is plugged in the receiving opening. The special feature lies in the rapid and yet very reliable connection of the two fastening elements to one another, the connection furthermore also being able to be separated again in a simple manner. Ball lock pins can also be easily inserted and fastened by machine. The funnel element can ensure simplified guidance of ball lock pins.

The fastening system may also comprise a securing element for securing the first fastening element on the structure. The securing element could be embodied in the form of a wire or the like which ensures fixing of the two fastening elements even in the case of strong vibrations. In particular, when using screwable fastening elements, a degree of screwing that may be responsible for establishing electrical contact is ensured.

The first fastening element and/or the second fastening element could be connectable to an additional holder, which is arranged on a side of the fastening element in question that faces away from the respectively other fastening element. The additional holder permits the attachment of further devices, such as for example damping elements which serve for decoupling purposes and which are formed from a rubber-elastic material. Holders for the arrangement of electrical lines or fluid lines are also conceivable.

The disclosure herein also relates to a vehicle comprising a structure and at least one fastening system according to the description above, the structure having a structural opening into or through which the first fastening element projects. The fitting element could be a partition, a cladding element, a storage compartment, a cabin monument, or the like.

The structure could have a stiffening component. The stiffening component may represent a primary structural component which reliably absorbs the loads arising during the operation of the vehicle and safeguards the shape of the vehicle.

The vehicle is preferably an aircraft, and the structure has a frame, a stringer and/or a stiffening component connected thereto.

The vehicle also comprises at least one cabin and a fitting element arranged therein, the fitting element being fastened to the structure of the vehicle by the fastening system.

BRIEF DESCRIPTION OF THE DRAWINGS

Further features, advantages and application possibilities of the disclosure herein emerge from the following description of the example embodiments and from the figures. Here, all of the features described and/or illustrated in the figures form the subject matter of the disclosure herein individually and in any desired combination, even independently of the combination of the features in the individual claims or the back-references thereof. Furthermore, in the figures, the same reference designations are used for identical or similar objects.

DETAILED DESCRIPTION

Figure 1:
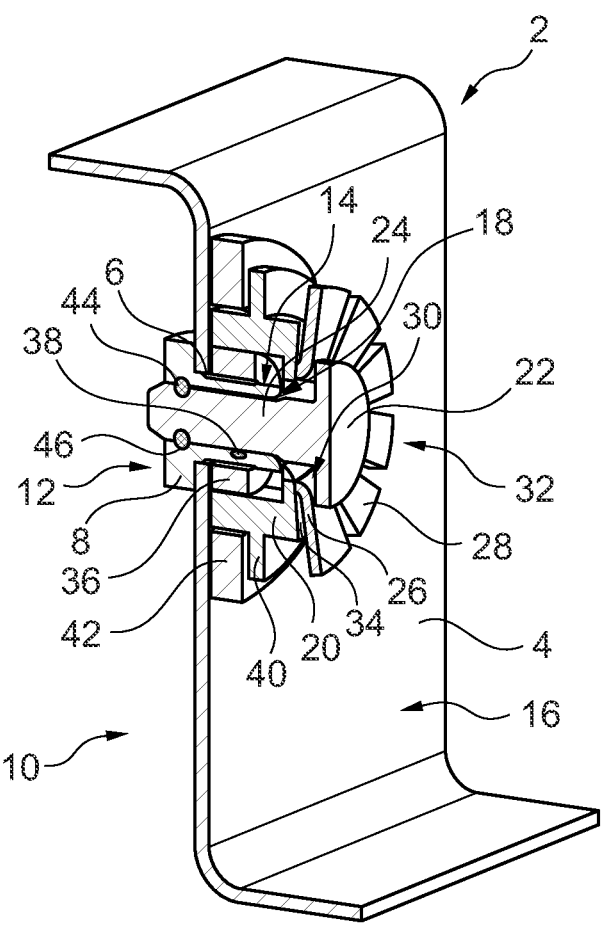
FIG. 1 shows a partial section of a fastening system in a fastened state.

FIG. 1 shows a partial section of a fastening system 2 in a fastened state. By way of example, a part of a structure 4 which for example forms part of a frame of a primary structure of an aircraft fuselage is illustrated. Located in the structure 4 is a structural opening 6, which is for example a through-bore. Located therein is a first fastening element 8 in the form of a bushing which has been plugged completely through the structural opening 6. On a first side 10 of the structure 4, the bushing 8 has a first collar 12, the diameter of which is larger than the diameter of the structural opening 6. The bushing 8 consequently rests on the structural component 4 by the collar 12. A base portion 14 of the bushing 8 projects through the structural opening 6 on a second side 16. The base portion 14 furthermore has a receiving opening 18 which is open toward the second side 16 of the structure 4.

The base portion 14 is surrounded by a spacer 20 which stands on the structure 4 and which extends in the direction of a second collar 22 of a second fastening element 24. The second fastening element 24 is introduced through the receiving opening 18 into the base portion 14.

Arranged between the second collar 22 of the second fastening element 24 and the spacer 20 is a funnel element 26 having a plurality of segments 28 which are distributed in the circumferential direction and which together form a flower-like disk shape in this illustration. In this case, the second collar 22 rests tightly on the funnel element 26, the individual segments 28 each having a fixed end 30 in a region between the second collar 22 and the spacer 20. In a radially outward direction, however, the individual segments 28 each have a free end 32. As a result of this configuration, the funnel element 26 can be plastically deformed such that a funnel shape which is visible in the following figures is changed by the second collar 22 into the disk shape shown here.

The spacer 20 has, on a side facing away from the structure 4, a support surface 34 which is of ring-shaped form. The individual segments 28 come into areal contact with the support surface when they are pushed in the direction of the structure 4 by the second collar 22.

The first fastening element 8 is screw-connected to the structure 4 by a nut 36. A securing element 38 secures this connection. A body 42, for example an insulating element, is clamped in between a radial protrusion 40 of the spacer 20 and the structure 4. The second fastening element 24 is embodied as a ball lock pin which has, at an end facing away from the second collar 22, radially movable locking balls 44 which can be introduced into a corresponding groove 46 of the first fastening element 8. The drawing has been simplified at this point and structures for radially moving the locking balls 44 are not explicitly illustrated here. However, a person skilled in the art will be readily able to use such a ball lock pin.

The special feature of the fastening system 2 lies in the possibility of having already attached the first fastening element 8 to the structure 4 of the vehicle in a preparatory step. By way of the components shown in FIG. 1, the second fastening element 24 can be connected very easily to the first fastening element 8 from the second side 16. Precise guidance of the second fastening element 24 into the first fastening element 8 can be effected by the funnel element 26 even in the case of a rough initial orientation. The subsequent bracing of the individual components and the plastic deformation of the funnel element 26 makes it possible to establish good electrical contact over the entire system 2. At the same time, thermal decoupling is made possible for example by the arrangement and form-fitting holding of the body 42. Furthermore, the construction shown permits an automated embodiment, such that an automatic or automated apparatus can be used to bring the component to be fastened to the structure 4 closer to the structure 4 in order for the second fastening elements 24 to subsequently be attached by machine.

Figure 2:
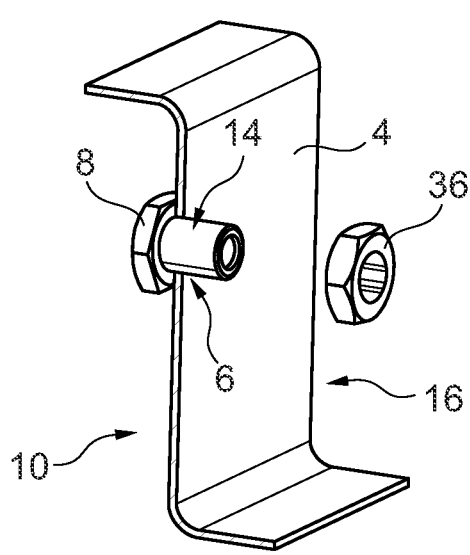
FIGS. 2 through 10 show the individual steps for fastening of the fastening system.

The individual steps and possible further example embodiments are examined in the following figures. FIG. 2 shows the structure 4, into which the first fastening element 8 has been inserted such that the base portion 14 projects through the structural opening 6. The first fastening element 8 is fixed with the aid of the nut 36. To this end, the base portion 14 for instance has an external thread, while the nut 36 has a corresponding internal thread.

Figure 3:
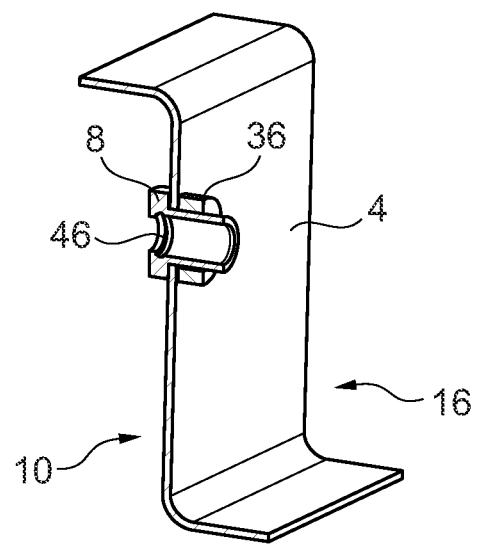

FIG. 3 shows a partial section of the inserted first fastening element 8 with screwed-on nut 36. Here, the groove 46 in which the locking balls 44 are subsequently arrested with latching action is visible.

Figure 4:
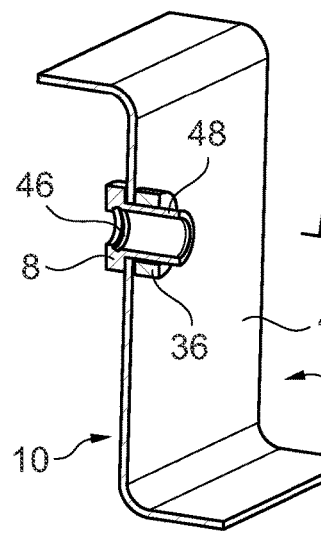
Figure 5:
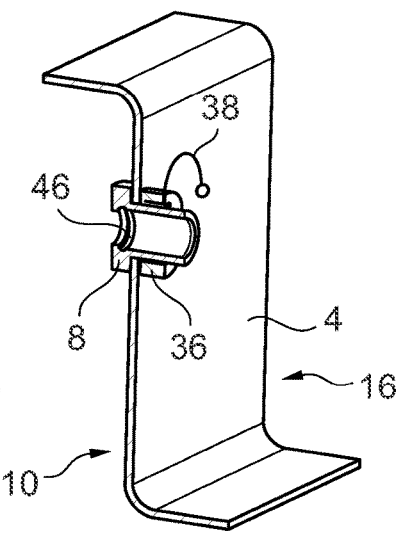
Figure 6:
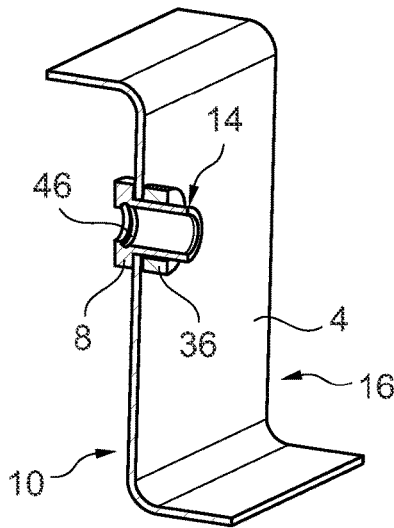

FIGS. 4-6 show the additional securing element 38, which can be plugged into a longitudinal recess 48 of the first fastening element 8 (see FIG. 5) and can subsequently surround the base portion 14 in a resilient manner (see FIG. 6) so as to be held against the latter. The screw connection between the first fastening element 8 and the nut 36 is then secured.

Figure 7:
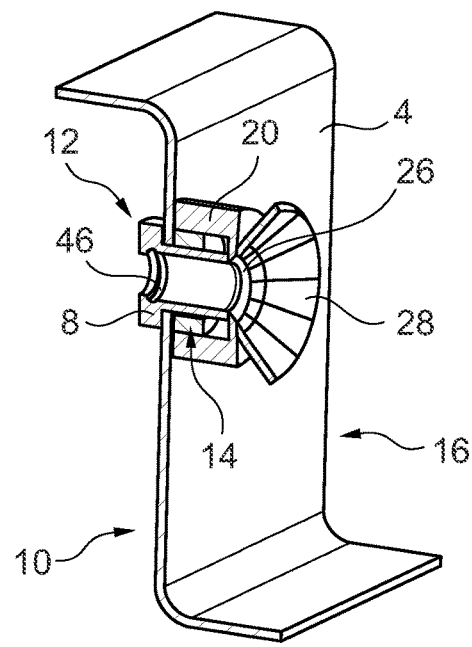

In FIG. 7, a combination of spacer 20 and funnel element 26 is placed around the base portion 14. Here, the spacer 20 and the funnel element 26 are embodied in one piece as a single component. The spacer 20 contacts the structure 4 by way of an end facing away from the funnel element 26. On the other side, the first collar 12 of the first fastening element 8 pushes onto the structure. The structure is consequently clamped between the spacer 20 and the first collar 12. Here, the segments 28 of the funnel element 26 directly adjoin one another and make contact in the circumferential direction. As a result, the funnel element 26 has the funnel-like basic shape. The funnel element has not yet been elastically deformed in FIG. 7.

Figure 8:
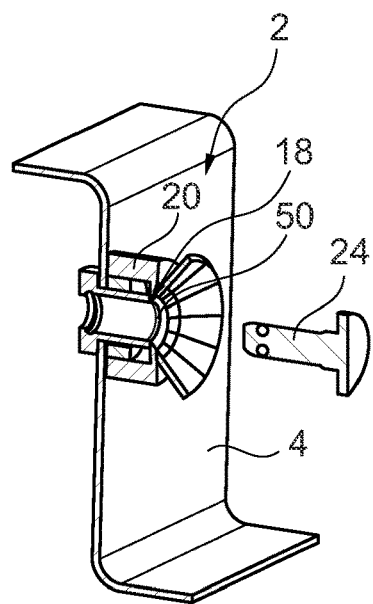

FIG. 8 shows the introduction of the second fastening element 24 into a funnel opening 50, by which the second fastening element 24 is guided directly into the receiving opening 18. To this end, the funnel opening 50 and the receiving opening 18 are arranged so as to be aligned with one another.

Figure 9:
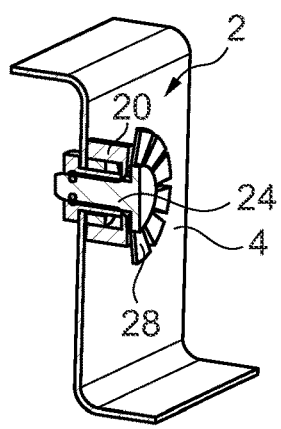
Figure 10:
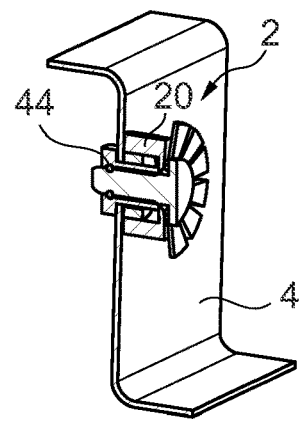

In FIG. 9, the second fastening element 24 has been completely introduced and, in FIG. 10, the locking balls 44 have furthermore been pushed radially outward such that they make form-fitting contact with the groove 46. As can also be seen in FIGS. 9 and 10, the funnel element 26 is deformed as a result of the pushing-in of the second fastening element 24, with the result that the segments 28 assume a flower-like disk shape. The individual segments 28 are then spaced apart from one another to a considerable extent.

Figure 11:
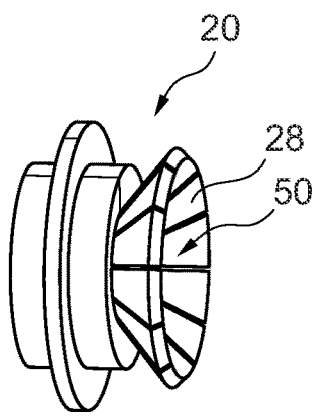
FIGS. 11 and 12 show the spacer together with a funnel element.
Figure 12:
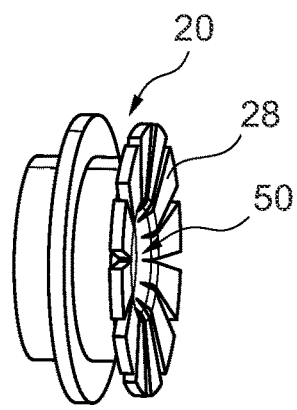

This is shown in two further, three-dimensional detail illustrations in FIGS. 11 and 12.

Figure 13:
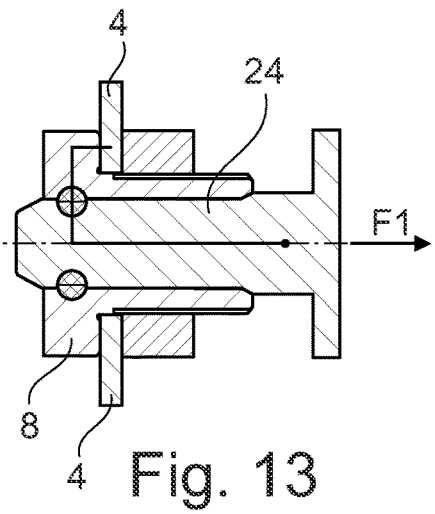
FIGS. 13 through 15 show detail sections of the system.
Figure 14:
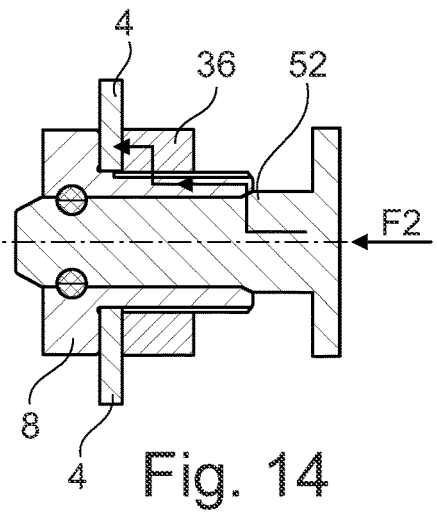

Here, the transmission of force between the first fastening element 8 and the second fastening element 24 is particularly advantageous. For instance, FIGS. 13 and 14 show possible force paths in the case of tensile loading (FIG. 13) and in the case of compressive loading (FIG. 14). In the case of the compressive loading, the compressive force is conducted via the second fastening element and a shoulder 52, which is provided by way of example and which abuts against the first fastening element 8 in a form-fitting manner, into the first fastening element 8 and via the nut 36 into the structure 4. It should be pointed out at this point that when using the spacer 20, the compressive forces may also be conducted directly via the spacer 20 into the structure.

Figure 15:
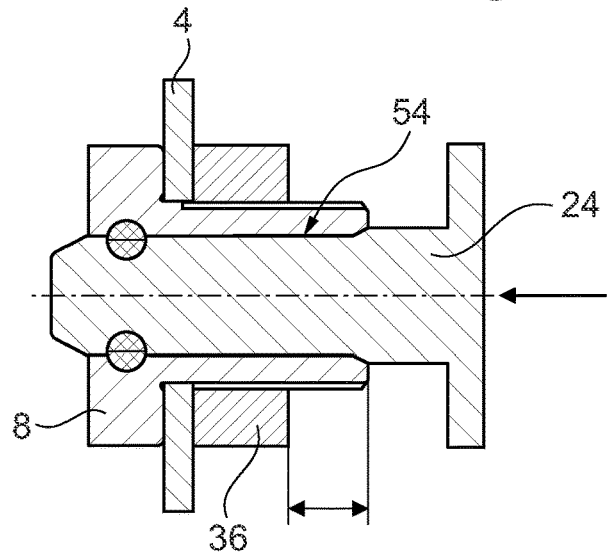

It is illustrated in FIG. 15 that, in order to improve the electrical contact, for example the second fastening element 24 may have a particularly conductive coating 54, which for instance comprises gold. Selection of the fits between the first fastening element 8 and the second fastening element 24 and the use of the coating 54 makes it possible to ensure an excellent electrical connection.

Figure 16:
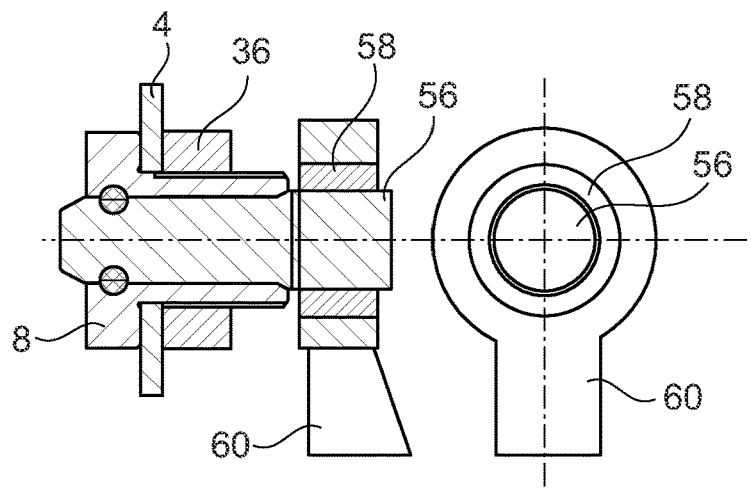
FIGS. 16 through 18 show further holders arranged on the fastening system.

FIG. 16 shows the arrangement of an additional holder 56, which for example bears a rubber-elastic material 58 that is coupled to another component 60. In this way, vibrations between the structure 4 and the component 60 can be decoupled in a very effective manner.

Figure 17:
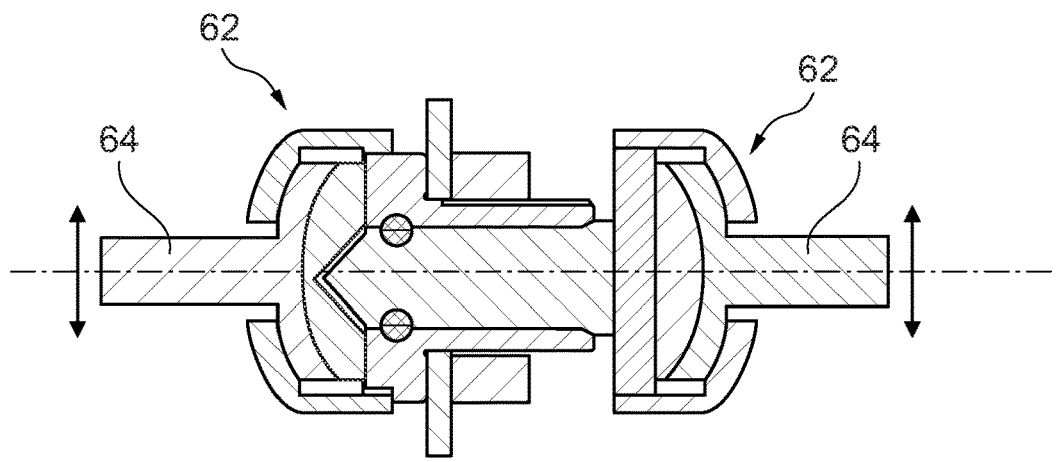
Figure 18:
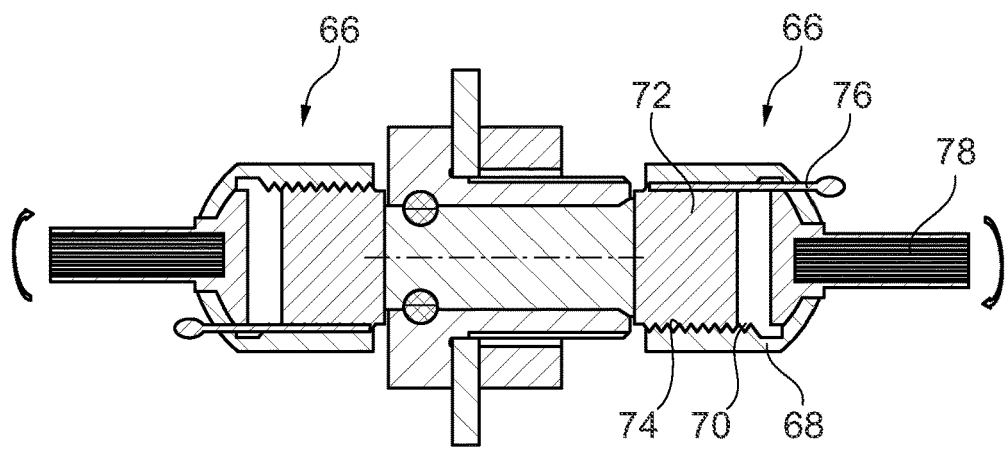

As illustrated in FIG. 17, it is additionally possible for a respective spherical joint 62 to be attached to the holding system 2, in order for additional holders 64 to be attached in an articulated manner here.

It is also conceivable to use quick-action connectors 66 with integrated tolerance compensation. These are known, for example, from DE 10 2018 112 783 A1. Here, a bell-like element 68 is provided, which has an internal toothing 70 which extends only over two diametrically opposed discrete portions. An elongate element 72 has an external toothing 74 corresponding thereto, which engages in the internal toothing 70 in a first rotary position and disengages therefrom in a rotary position offset by 90° and is axially displaceable relative to the bell-like element 68. By plugging the bell-like element 68 onto the elongate element 72, it is possible for an intended axial position to be assumed, which is subsequently held by a relative rotation of the two elements 68 and 72 as a result of the toothings 70 and 74 engaging in one another. A securing pin 76 may subsequently engage in a securing groove 78 and, as a result, lock the rotary position. The bell-like element 68 may hold a tension cable 78, which is braced with an installation component.

Figure 19:
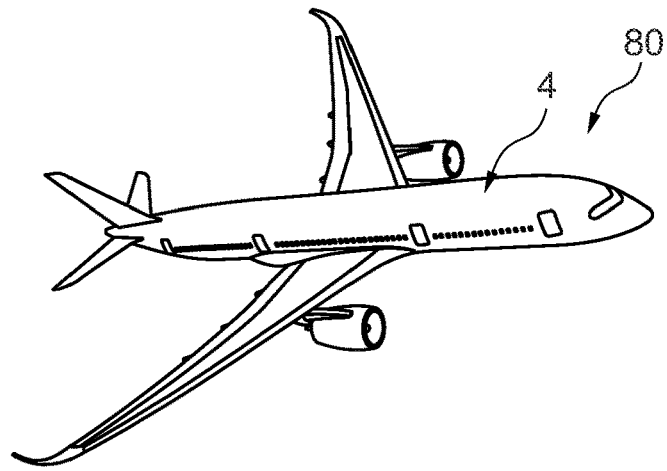
FIG. 19 shows an aircraft.

FIG. 19 shows a vehicle 80, which is in the form of an aircraft, which has for example a cabin in which components are connected to the structure 4 of the aircraft by such a holding system 2.

It is additionally pointed out that "having" or "comprising" does not rule out other elements or steps, and "a" or "an" does not rule out a multiplicity. It is also pointed out that features that have been described with reference to one of the above example embodiments may also be used in combination with other features of other example embodiments described above. Reference designations in the claims are not to be regarded as limiting.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE DESIGNATIONS

2 Fastening system
4 Structure
6 Structural opening
8 First fastening element/bushing
10 First side
12 First collar
14 Base portion
16 Second side
18 Receiving opening
20 Spacer
22 Second collar
24 Second fastening element
26 Funnel element
28 Segment
30 Fixed end
32 Free end
34 Support surface
36 Nut
38 Securing element
40 Radial protrusion
42 Body
44 Locking ball
46 Groove
48 Longitudinal recess
50 Funnel opening
52 Shoulder
54 Conductive coating
56 Holder
58 Rubber-elastic material
60 Component
62 Spherical joint
64 Holder
66 Quick-action connector
68 Bell-like element
70 Internal toothing
72 Elongate element
74 External toothing
76 Securing pin
78 Tension cable
80 Vehicle

The invention claimed is:

1. A fastening system comprising:
    a first fastening element which is attachable to a structure and which comprises:
        a first collar configured to be fixed against a first side of the structure; and a base portion configured for plugging through a structural opening toward a second side of the structure opposing the first side;

a second fastening element comprising a second collar; and a plastically deformable funnel element, the funnel element having a funnel-like basic shape with a funnel opening;

wherein the funnel element is configured to be positioned between the second fastening element and the first fastening element to guide the second fastening element to the funnel opening and into a receiving opening of the base portion to be fastened therein;

wherein the second collar faces away from the receiving opening and is larger than the funnel opening; and wherein the second collar is configured to rest tightly on the funnel element such that the funnel element is deformed from the funnel-like basic shape into a flat, disk-like final shape by the second collar of the second fastening element during fastening of the second fastening element.

2. The fastening system of claim 1, further comprising a spacer with a through-bore, the spacer being able to be positioned between the first fastening element and the funnel element and having a support surface for supporting the funnel element.

3. The fastening system of claim 2, wherein the spacer comprises a circumferential, radial protrusion for holding a body between the protrusion and the structure.

4. The fastening system of claim 2, wherein the support surface is ring-shaped and surrounds the through-bore at an end facing the funnel element.

5. The fastening system of claim 2, wherein the spacer and the funnel element are embodied as a one-piece element.

6. The fastening system of claim 1, wherein the funnel element comprises a plurality of segments distributed in a circumferential direction and which each have a radially external free end and a radially internal fixed end.

7. The fastening system of claim 1, wherein the first fastening element comprises at least one circumferential groove in the receiving opening, and the second fastening element is a ball lock pin with radially movable locking balls which project into the at least one groove when the second fastening element is plugged in the receiving opening.

8. The fastening system of claim 1, further comprising a securing element for securing the first fastening element on the structure.

9. The fastening system of claim 1, wherein the first fastening element and or the second fastening element are connectable to an additional holder, which is arranged on a side of a fastening element facing away from a respectively other fastening element.

10. A vehicle comprising a structure and at least one fastening system comprising:

a first fastening element which is attachable to the structure and which comprises a base portion, the structure having a structural opening into or through which the first fastening element projects;

a second fastening element comprising a collar; and a plastically deformable funnel element, the funnel element having a funnel-like basic shape with a funnel opening;

wherein the funnel element is configured to be positioned between the second fastening element and the first fastening element to guide the second fastening element to the funnel opening and into a receiving opening of the base portion to be fastened therein;

wherein the collar faces away from the receiving opening and is larger than the funnel opening; and wherein the second collar is configured to rest tightly on the funnel element such that the funnel element is deformed from the funnel-like basic shape into a flat, disk-like final shape by the collar of the second fastening element during fastening of the second fastening element.

11. The vehicle of claim 10, wherein the vehicle is an aircraft, and the structure comprises a frame, a stringer and or a stiffening component connected thereto.

12. The vehicle of claim 10, further comprising at least one cabin and a fitting element arranged therein, the fitting element being fastened to the structure of the vehicle by the fastening system.

13. A fastening system comprising:
a first fastening element which is attachable to a structure and which comprises:
 a first collar configured to be fixed against a first side of the structure; and
 a base portion configured for plugging through a structural opening toward a second side of the structure opposing the first side;
a second fastening element; and
a plastically deformable funnel element, the funnel element having a funnel-like basic shape with a funnel opening;
wherein the second fastening element is able to be introduced through to the funnel opening and into a receiving opening of the base portion to be fastened therein and has a second collar which faces away from the receiving opening and is larger than the funnel opening;
the funnel element being configured to be deformed from the funnel-like basic shape into a flat, disk-like final shape by the second collar of the second fastening element during fastening of the second fastening element; and
a spacer with a through-bore, the spacer being able to be positioned between the first fastening element and the funnel element and having a support surface for supporting the funnel element.

* * * * *